US008611477B1

(12) United States Patent
Nabar et al.

(10) Patent No.: US 8,611,477 B1
(45) Date of Patent: Dec. 17, 2013

(54) ESTIMATING AND COMPENSATING FOR NOISE ON ANTENNAS OF A MULTI-ANTENNA WIRELESS SYSTEM

(75) Inventors: Rohit U. Nabar, Sunnyvale, CA (US); Hongyuan Zhang, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 1123 days.

(21) Appl. No.: 12/435,166

(22) Filed: May 4, 2009

Related U.S. Application Data (60) Provisional application No. 61/055,029, filed on May 21, 2008.

(51) Int. Cl.
*H04L 27/08* (2006.01)

(52) U.S. Cl.
USPC ......................................... 375/345

(58) Field of Classification Search
USPC .................................. 375/345, 260
See application file for complete search history.

(56) References Cited

U.S. PATENT DOCUMENTS

| 7,161,996 B1 * | 1/2007 | Steele et al. | 375/347 |
| 2005/0249304 A1 * | 11/2005 | Takano et al. | 375/267 |
| 2008/0240217 A1 * | 10/2008 | Lee et al. | 375/227 |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999) Reaffirmed Jun. 12, 2003.

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band,"0 *The Institute of Electrical and Electronics Engineers, Inc.*, 1999.

(Continued)

*Primary Examiner* — Kevin Kim (57) ABSTRACT

A method for estimating and compensating for noise on antennas of a multi-antenna wireless system. The method includes receiving multiple signals via multiple receive antennas of a receiver, where each of the signals is received via a respective antenna. The method further includes estimating noise power imbalance corresponding to the receive antennas based on the multiple signals.

19 Claims, 5 Drawing Sheets

(56) References Cited

OTHER PUBLICATIONS

IEEE Std 802.11b-1999/Cor 1-2001 (Corrigendum to IEEE Std 802.11b-1999) "IEEE Standard for Information technology—Telecommunications and information exchange between systems—Local and metropolitan area networks-Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D2.8, May 2002 (Supplement to ANSI/IEEE Std 802.11, 1999 Edition) Draft Supplement to Standard [for] Information technology—Telecommunications and information exchange between systems-Local and metropolitan area networks-Specific requirements—Part 11: Wireless LAN Medium Access Control (MAC) and Physical Layer (PHY) specifications: Further Higher-Speed Physical Layer Extension in the 2.4 GHz Band, *The Institute of Electrical and Electronics Engineers, Inc.*, May 2002.

IEEE Std 802.11g/D8.2, Apr. 2003 (Supplement to ANSI/IEEE Std 802.11, 1999 (Reaff 2003)) Draft Supplement to Standard [for] Information technology—Telecommunications and information exchange between systems-Local and metropolitan area networks-Specific requirements—Part 11: Wireless LAN Medium Access Control (MAC) and Physical Layer (PHY) specifications: Further Higher Date Rate Extension in the 2.4 GHz Band, *The Institute of Electrical and Electronics Engineers, Inc.*, Apr. 2002.

IEEE Std P802.11-REVma/06.0, "Unapproved Draft Standard for Information Technology—Telecommunications and information exchange between systems—Local and metropolitan area network-Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma_D7.0).", 2006.

IEEE Std 802.Nov. 2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

"IEEE P802.11n™/D3.00, Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

van Nee, et al. "The 802.11n MIMO-OFDM Standard for Wireless LAN and Beyond," Wireless Personal Communications, vol. 37, pp. 445-453 (Jun. 2006).

IEEE Std 802.11h™—2003, "IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe," The Institute of Electrical and Electronics Engineers, Inc., Oct. 14, 2003; 75 pages.

IEEE Std 802.16a-2003 (Amendment to IEEE Std 802.16/2001) "IEEE Standard for Local and metropolitan area networks: Part 16: Air Interface for Fixed Broadband Wireless Access Systems-Amendment 2: Medium Access Control Modifications and Additional Physical Layer Specifications for 2-11 GHZ," The Institute of Electrical and Electronics Engineers, Inc., Apr. 1, 2003.

IEEE Std 802.16/2004 (Revision of IEEE Std 802.16/2001), "IEEE Standard for Local and metropolitan area networks; Part 16: Air Interface for Fixed Broadband Wireless Access Systems," The Institute of Electrical and Electronics Engineers, Inc., Oct. 1, 2004; 893 pages.

IEEE Std 802.16e-2005 and IEEE Std 802.16/2004/Cor1-2005 (Amendment and Corrigendum to IEEE Std 802.16/2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, The Institute of Electrical and Electronics Engineers, Inc., Feb. 28, 2006.

IEEE P802.16Rev2/D5 (Jul. 2008) (Revision of IEEE Std 802.16/2004 and consolidates material from IEEE Std 802.16e-2005, Std 802.16/2004/Cor1-2005, Std 802.16f-2005 and Std 802.16g-2007) "Draft Standard for Local and metropolitan area networks: Part 16: Air Interface for Broadband Wireless Access Systems," The Institute of Electrical and Electronics Engineers, Inc., Jun. 2008.

IEEE 802.20-Pd-06; IEEE P 802.20TMV14, Draft 802.20 Permanent Document; <System Requirements for IEEE 802.20 Mobile Broadband Wireless Access Systems—Version 14>, Jul. 16, 2004; 24 pages.

* cited by examiner

ESTIMATING AND COMPENSATING FOR NOISE ON ANTENNAS OF A MULTI-ANTENNA WIRELESS SYSTEM

CROSS REFERENCE TO RELATED APPLICATION

This application claims the benefit of U.S. Provisional Patent App. No. 61/055,029 entitled "Method and Noise Power Imbalance Estimation in WLAN Systems," filed May 21, 2008, the disclosure of which is hereby expressly incorporated herein by reference.

FIELD OF TECHNOLOGY

The present disclosure relates generally to multi-antenna wireless systems and, more particularly, to estimating and compensating for noise on antennas of a multi-antenna wireless system.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or higher data rate, making the wireless technology a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Multiplexing (OFDM) encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier. Data upon each sub-carrier may modulated with a modulation scheme such as quadrature amplitude modulation, phase shift keying, etc. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16 IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16 IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols, and these symbols are then processed in a viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. Further, the 802.16 standard, or WiMAX, applies to cell-based systems and supports MIMO techniques. Generally speaking, the use of MIMO technology produces significant increases in spectral efficiency and link reliability of IEEE 802.11, IEEE 802.16, and other systems, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

The transmitters and receivers in the wireless communication system may each be capable of using a variety of modulation schemes. For example, some modulations schemes may provide a higher bit rate than other schemes (e.g., 64-QAM vs. 16-QAM). Typically, modulation schemes that provide a higher bit rate may be more sensitive to channel impairments as compared to modulation schemes with a lower bit rate.

In all communication systems discussed above, as well as in most wireless communication system, receivers sometimes receive corrupt data, or fail to receive data altogether, because of noise, interference, temporary resource failure, or other reasons. As a result, wireless communication systems typically utilize some sort of noise compensation. Conventional noise compensation methods assume that different transmit and receive antennas experience the same noise powers, which is not true in practice.

SUMMARY

The present disclosure provides methods and apparatus for estimating and compensating for noise on antennas of a multi-antenna wireless system.

In one embodiment, a method includes receiving multiple signals via multiple receive antennas of a receiver, where each of the signals is received via a respective antenna. The method further includes estimating noise power imbalance corresponding to the receive antennas based on the multiple signals.

In another embodiment, a method includes receiving multiple signals via a multiple receive antennas. The method further includes estimating multiple noise powers corresponding to the receive antennas based on the received signals, where each noise power corresponding to a respective antenna.

In another embodiment, an apparatus includes multiple noise power estimators to estimate respective noise powers corresponding to multiple receive antennas based on respective signals received via multiple receive antennas. The apparatus further includes multiple scaling factor generators to generate multiple respective scaling factors based on the estimated noise powers. The apparatus further includes multiple amplifiers to scale signals received via multiple antennas based on the generated scaling factors.

DETAILED DESCRIPTION

Noise power imbalance across antennas of multi-antenna wireless systems is a common occurrence due to components and circuitry imperfections, and because of differences in background interference affecting various receive signal paths. As a result, conventional noise compensation methods that ignore this noise power imbalance may lead to suboptimal noise compensation, and more generally, to suboptimal detection and decoding.

Figure 1:
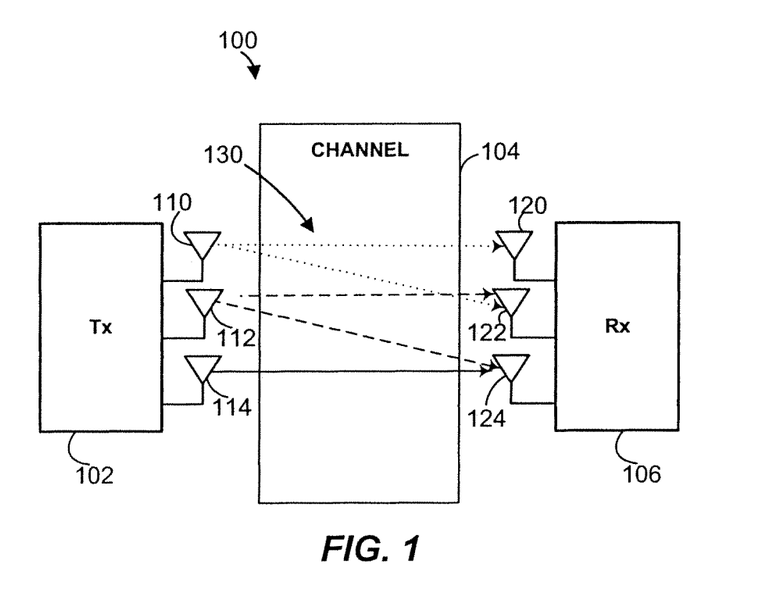
FIG. 1 is a block diagram of an example wireless communication system.

FIG. 1A is a block diagram of an example wireless communication system 100 in which a transmitting device 102 transmits information over a wireless communication channel 104 to a receiving device 106. Each of the devices 102 and 106 may be a base station or a mobile station equipped with a set of antennas 110-114 and 120-124, respectively. Further, the communication channel 104 includes a K subcarriers $C_1$, $C_2$, ..., $C_K$, each associated with a particular frequency at which the devices 102 and 106 may communicate. The antennas 110-114 and 120-124 define multiple spatial streams 130 within the wireless communication channel 104 during operation of the devices 102 and 106. In general, the wireless communication system 100 may include any number of devices, each equipped with the same or a different number of antennas such as 1, 2, 3, 4, .... The wireless communication system 100 may also include any number of subcarriers. In the embodiment illustrated in FIG. 1, the wireless communication system 100 uses an OFDM technique, and the subcarriers $C_1$, $C_2$, ... $C_K$ are accordingly selected to be mutually orthogonal (i.e., to minimize cross-talk between each pair of subcarriers). However, the wireless communication system 100 could also use any other frequency division multiplexing technique. It will be also noted that while the example wireless communication system 100 is a MIMO system, at least some of the methods and apparatus for noise compensation discussed herein may be applied to a system with multiple-antenna receivers and a single-antenna transmitter.

The transmitting device 102 may transmit OFDM symbols via subcarriers $C_1$, $C_2$, $C_K$, to the receiving device 106. Each OFDM symbol may include a number of individual symbols, each transmitted via a respective subcarrier $C_i$. A given signal $Y_{k,m,n}$ is a signal received by the receiving device 106 on the k-th subcarrier (or frequency, or tone) via the n-th receive antenna and corresponding to the m-th OMDF symbol. The received signal may be given by:

$$Y_{k,m,n} = H_k S_{k,m} + Z_{k,m,n} \quad (1)$$

where $H_k$ is the channel gain for the k-th tone, $S_{k,m}$ is the transmitted individual symbol on the k-th tone of the of the m-th OFDM symbol, and $Z_{k,m,n}$ is noise on the k-th tone of the m-th OMDF symbol for n-th receive antenna.

Figure 2:
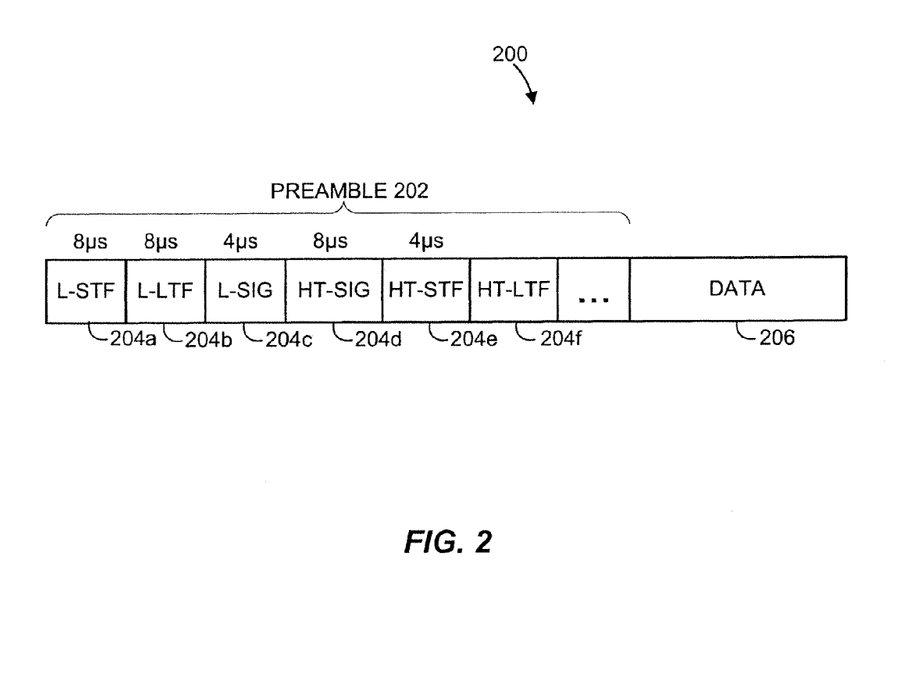
FIG. 2 is a block diagram of an example data frame.

FIG. 2 is a block diagram of an example data frame 200 that may be used in the wireless communication system 100 to transmit signals over a wireless communication channel 104. It will be understood, however, that the wireless communication system 100 may alternatively use other types of data frames 200. It will be further understood that although the format of the data frame 200 is similar to the format of a mixed-mode frame under IEEE 802.11n, the present disclosure is not limited to any particular type of a data frame. Moreover, the present disclosure is not limited to wireless local area networks and contemplates wireless networks in general.

The data frame 200 generally includes different fields that are separated in time (e.g., the L-STF field 204a occupies the first 8 μs, the L-STF field 204b occupies the next 8 μs, and so on). More specifically, the data frame 200 includes a data section 206 and a preamble 202 including a number of fields 204, such as training fields (e.g., Legacy Short Training Field (L-STF) 204a, Legacy Long Training Field (L-LTF) 204b) and signal fields (e.g., Legacy Signal Field (L-SIG) 204c, High Throughput Signal Field (HT-SIG) 204d) that a receiving device 106 may use to estimate the channel. Furthermore, as will be subsequently described in more detail, fields 204 of the preamble 202 may also be used to estimate noise power on particular antennas in a multi-antenna wireless system and, consequently, to estimate noise power imbalance across the different antennas.

As an example, the High Throughput Signal (HT-SIG) field 204d, or the Legacy Long Training Field (L-LTF) 204b, may be used to estimate and compensate for the noise power on a particular antenna. The HT-SIG field 204, for instance, is generated at the transmitting device 102 from B bits of information, which includes information about the nature (e.g., modulation parameters, code rate, payload length, etc.) of the packets. At the transmitting device 102, the B bits are encoded (using e.g., a convolution encoder) and mapped to Q bits, which are then modulated (e.g., using binary shift keying (BPSK) modulation. Thus, at the receiving device 106, the HT-SIG field 204d signal must be demodulated to recover the Q bits, and the Q bits must be decoded (e.g., using a convolutional decoder) to recover the original B bits. Similarly, the LFT field 204b includes known signals (referred to as "pilots") that can be used to derive channel estimates. Consequently, data in the HT-SIG Field 204d, or in the L-LTF field 204b may be used to estimate a channel gain $\hat{H}_k$ for the k-th tone. $\hat{H}_k$ can then be used to estimate the noise power on a particular antenna and to estimate noise power imbalance across multiple antennas, as will be subsequently described.

Figure 3:
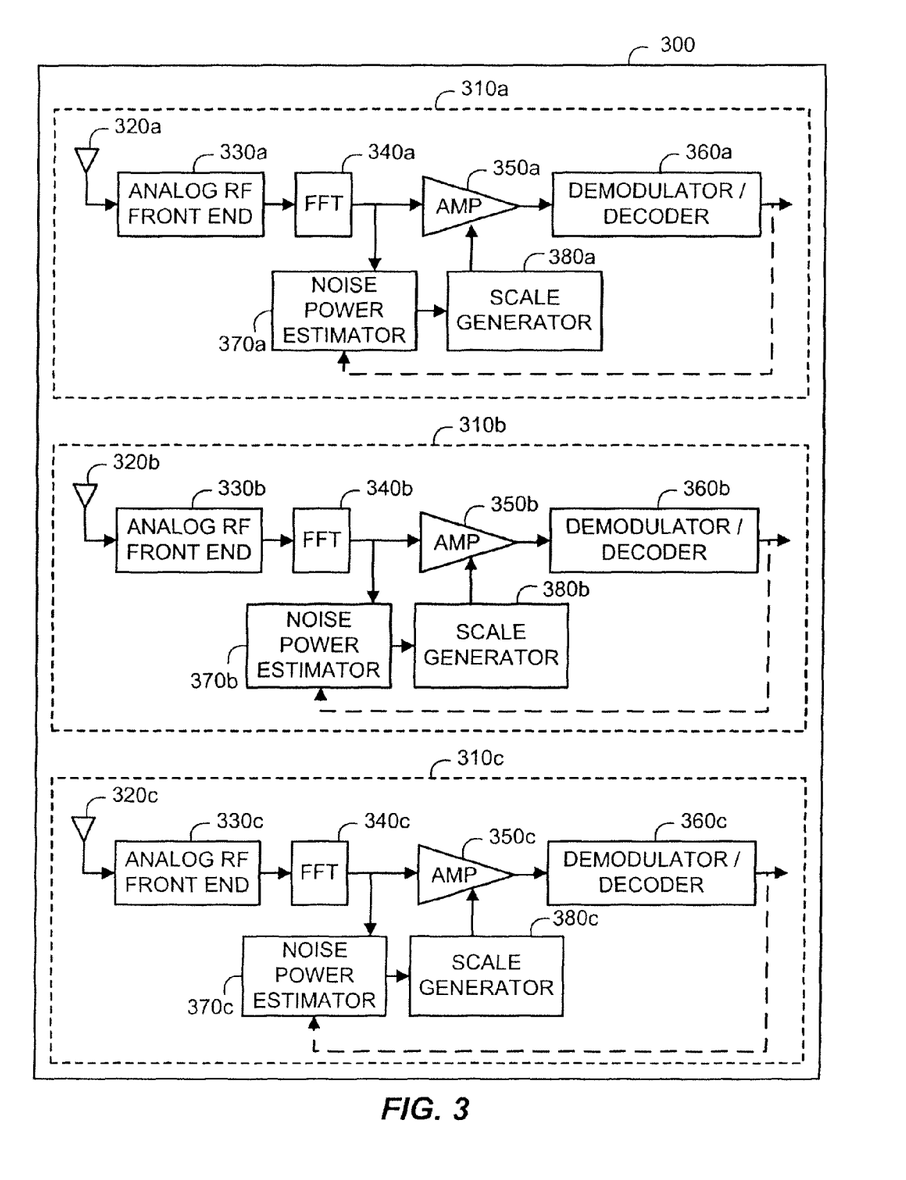
FIG. 3 is a block diagram of an example multi-antenna receiving device capable of estimating and compensating for the noise power on a particular antenna.

FIG. 3 is a block diagram of an example multi-antenna receiving device 300 capable of estimating and compensating for the noise power on a particular antenna. The receiving device 300 may be utilized in the wireless communication system 100 as the receiving device 106, for example. It will be understood, however, that the wireless communication system 100 may alternatively use another receiving device 106.

The receiving device 300 generally includes a number of receive antennas 320 for receiving radio signals. The receiving device 300 may further include RF receiving units (e.g., analog RF front end 330) that perform RF downconversion and filtering of the received signals. In order to perform certain processing functions, the receiving devices may convert the received signal from time domain to frequency domain, using, for example, Fast Fourier Transform (FFT) units 340. The received signals may be converted to frequency domain at various stages of processing.

The receiving device 300 may further include noise power estimators 370 that estimate the noise power on different receive antennas 320 and scale generators 380 that generate a scaling factor to compensate for the noise on the antennas. In order to compensate for the noise on the receive antennas 320, the receiving device 300 may include amplifiers 350 that scale the received signals based on the scale factors generated by the scale generators 380. Although FIG. 3 illustrates scaling in frequency domain (after the received signals are converted to the frequency domain by the FFT units 340), scaling may also take place in time domain (before the received signals are converted to the frequency domain by the FFT units 340). The receiving device 300 may further include demodulator/decoder units 360 (e.g., including QAM demodulators and BPSK decoders) that generally demodulate and decode the received signals into information symbols.

Figure 4:
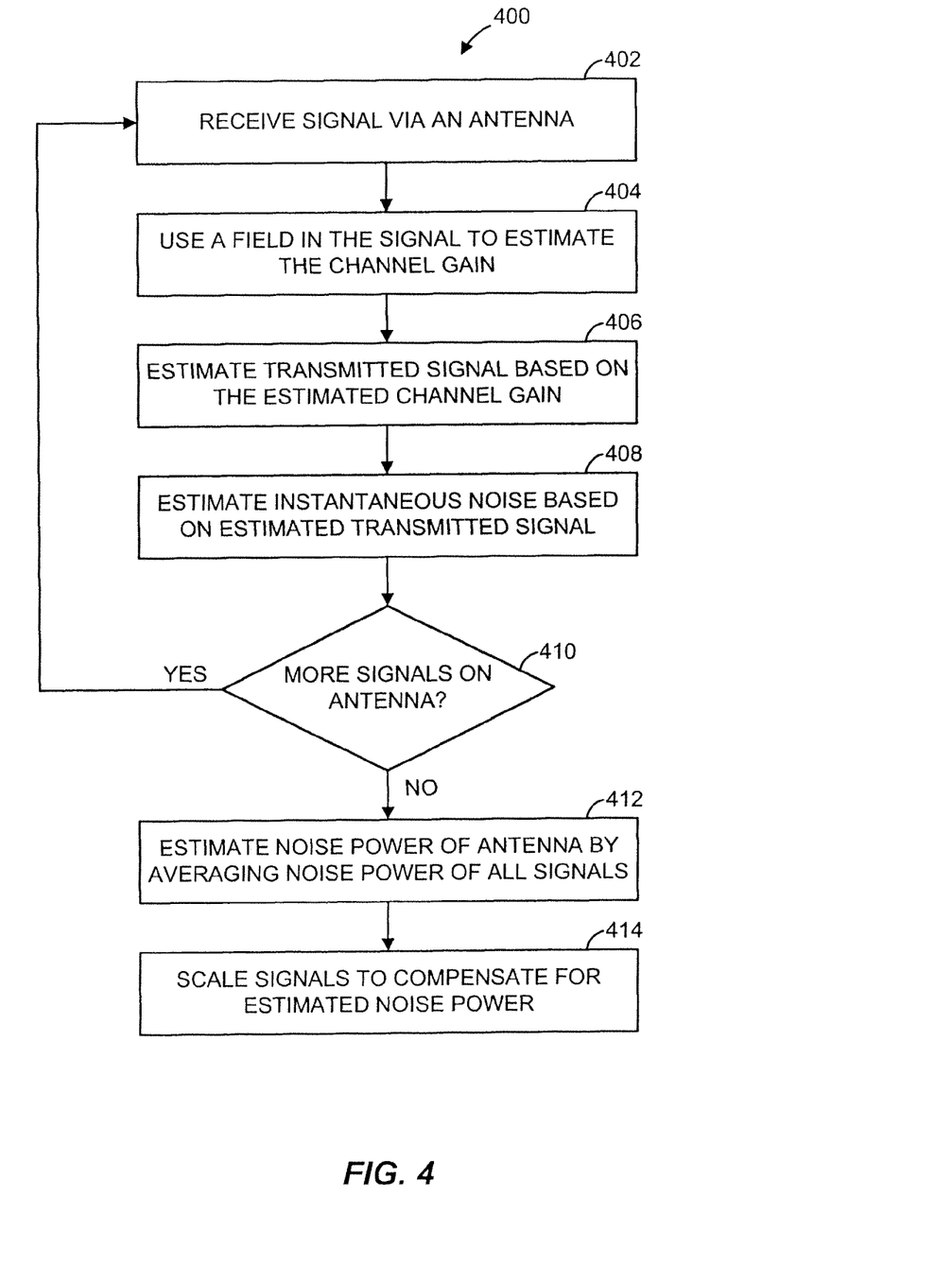
FIG. 4 is a flow diagram illustrating an example method for estimating and compensating for the noise power on a particular antenna.

FIG. 4 is a flow diagram illustrating an example method 400 for estimating and compensating for the noise power on a particular antenna. For ease of explanation, FIG. 4 will be described with reference to FIGS. 1-3. It will be understood, however, that the method 400 may be utilized with systems and devices other than those illustrated in FIGS. 1-3.

As discussed above, when a receiving device (such as the receiving device 106) receives a signal $Y_{k,m,n}$, corresponding to tone k, OFDM symbol m, received via antenna n (block 402), the receiving device may use one or more fields in the received signal (e.g., the L-LTF field 204b) to estimate a channel gain $\hat{H}_k$ for that tone (block 404). Once the channel gain $\hat{H}_k$ is estimated, the receiving device, based on the estimated channel gain $\hat{H}_k$, may estimate the transmitted signal $\hat{S}_{k,m}$. As an example, the receiving device may estimate $\hat{S}_{k,m}$ as follows:

$$\hat{S}_{k,m} = \text{sign}\left(\text{Re}\left(\frac{Y_{k,n,m}}{\hat{H}_k}\right)\right), \text{sign}(x) = \begin{cases} 1 & \text{if } x \geq 1 \\ -1 & \text{if } x < 1 \end{cases} \quad (2)$$

Once the transmitted signal for the k-th tone of m-th symbol ($\hat{S}_{k,m}$) has been estimated (e.g., using equation 2), the receiving device may use this estimation to further estimate the instantaneous noise ($\hat{Z}_{k,m,n}$) for the k-th tone of m-th symbol on the antenna n in question. In some embodiments, this instantaneous noise can be estimated as follows:

$$\hat{Z}_{k,m,n} = Y_{k,m,n} - \hat{H}_k \hat{S}_{k,m} \quad (3)$$

The receiving device may perform this process for signals associated with other tones and symbols (YES branch in block 410). If there are no more signals (NO branch in block 410), the receiving device may estimate the noise power on the antenna ($\sigma_n^2$) by averaging the noise powers over all tones and all OFDM symbols of the HT-SIG field (block 412), for example, as follows:

$$\sigma_n^2 = \frac{1}{KM} \sum_{k,m} |\hat{Z}_{k,n,m}|^2 \quad (4)$$

Once the receiving device estimates the noise power on the antenna, the receiving device may compensate for the noise by scaling the signals on that antenna based on estimated power (block 414). For example, the scaled signals $\tilde{y}_n$ on a given antenna n may be represented as:

$$\tilde{y}_n = \frac{y_n}{X\sigma_n}, \qquad (5)$$

where $y_n$ is the signal received via the n-th antenna, and X is an optional configurable parameter, such as a constant.

As explained in reference to FIG. 3, the signals can be scaled to account for noise at various stages in the processing. For instance, the signals may be scaled in time domain (before the received signals are converted to the frequency domain by the FFT units 340). The signals may also be scaled in frequency domain.

The result of the method 300 described above in reference to FIG. 3 is that signals received via different antennas are treated differently with respect to noise estimation and compensation. More specifically, the receiving device will scale the signals it receives based at least in part on the antenna via which the receiving device receives the signal. This leads to an improved detection and decoding of received data.

Figure 5:
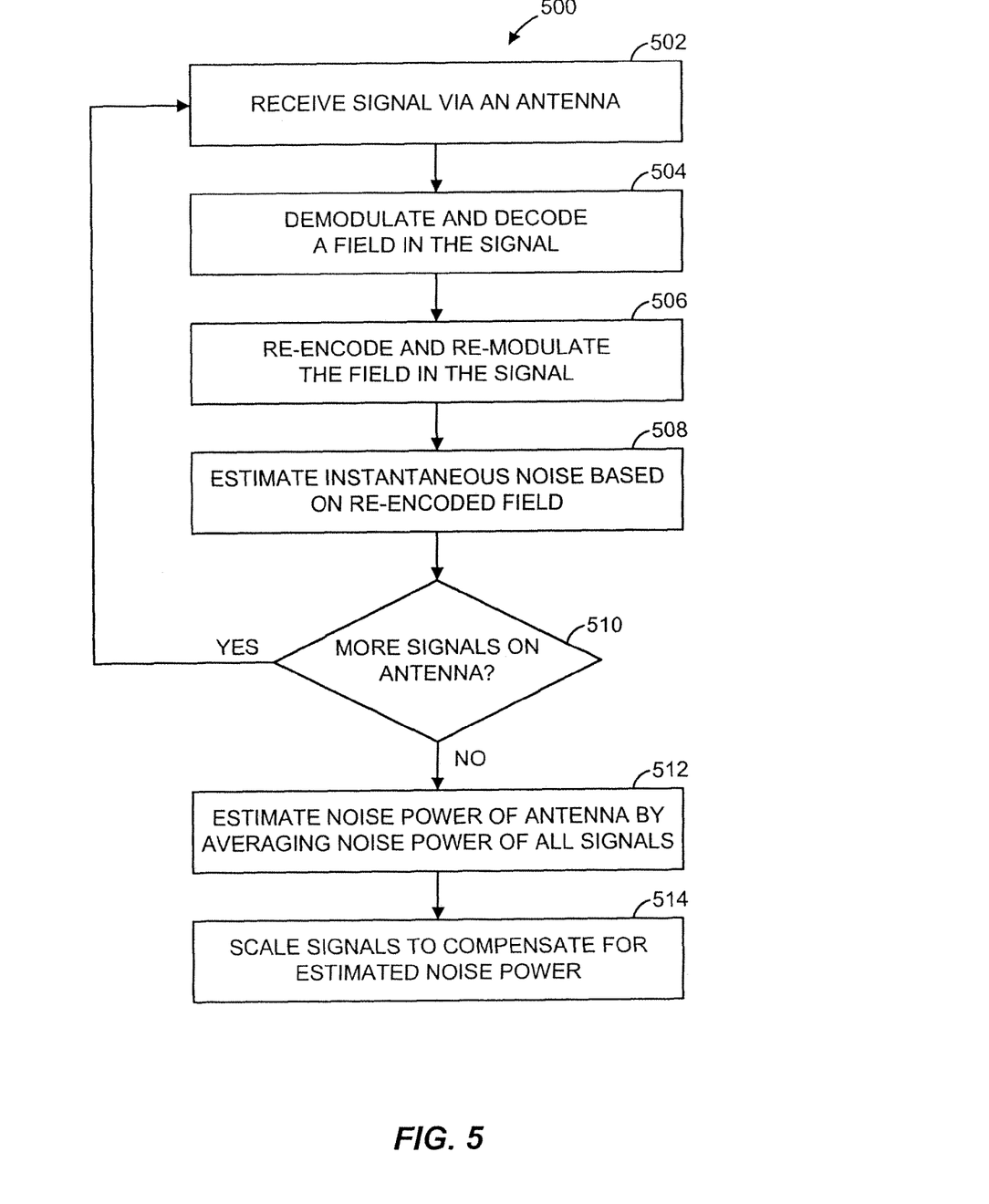
FIG. 5 is a flow diagram illustrating another example method for estimating and compensating for the noise power on a particular antenna.

FIG. 5 is a flow diagram illustrating another example method 500 for estimating and compensating for the noise power on a particular antenna. For ease of explanation, FIG. 5 will be described with reference to FIGS. 1-3. It will be understood, however, that the method 500 may be utilized with systems and devices other than those illustrated in FIGS. 1-3.

When a receiving device receives a signal $Y_{k,m,n}$ on a given tone k of a given OFDM symbol in via a particular antenna n (block 502), the receiving device may choose one or more fields in the received signal (e.g., the L-LTF field 204b in the preamble) and demodulate and decode those fields before decoding the rest of the signal (block 504). The receiving device may demodulate and decode those fields using any suitable techniques. The receiving device may then re-encode and re-modulate the selected fields to form an estimate of the transmitted signal $\overline{S}_{k,m}$ (block 506).

Once an estimate of the transmitted signal $\overline{S}_{k,m}$ is formed, noise power on the antenna may be estimated and compensated for using techniques similar to those discussed in reference to FIG. 3. In particular, the receiving device may use this estimation of the transmitted signal $\overline{S}_{k,m}$ to estimate the instantaneous noise ($\overline{Z}_{k,m,n}$) for the k-th tone of the m-th OFDM symbol on the antenna n in question (block 508).

$$\overline{Z}_{k,m,n} = Y_{k,m,n} - \hat{H}_k \overline{S}_{k,m} \qquad (6)$$

where $\hat{H}_k$ is determined from the information in the fields 204 of the received signal, as discussed above.

The receiving device may perform this process for signals associated with other tones and symbols (YES branch in block 510). If there are no more signals (NO branch in block 510), the receiving device may estimate the noise power on the antenna ($\sigma_n^2$) by averaging the noise powers over all tones and all OFDM symbols of the HT-SIG field (block 512), for example, as follows:

$$\sigma_n^2 = \frac{1}{KM} \sum_{k,m} |\overline{Z}_{k,n,m}|^2 \qquad (7)$$

Once the receiving device estimates the noise power on the antenna, the receiving device may compensate for the noise by scaling the signals on that antenna based on estimated power (block 514). For example, as discussed in reference to FIG. 4, the scaled signals $\tilde{y}_n$ on a given antenna n may be represented as:

$$\tilde{y}_n = \frac{y_n}{X\sigma_n}, \qquad (8)$$

where $y_n$ is the signal received via the n-th antenna, and X is an optional configurable parameter, such as a constant.

As explained in reference to FIG. 3, the signals can be scaled to account for noise at various stages in the processing. For instance, the signals may be scaled in time domain (before the received signals are converted to the frequency domain by the FFT units 340). The signals may also be scaled in frequency domain.

The method 500 described above in reference to FIG. 5 is similar to the method 400 described in reference to FIG. 4 in that both methods treat signals received via different antennas differently with respect to noise estimation and compensation. In particular, the receiving device will scale the signals it receives by a factor that is based at least in part on the antenna via which the receiving device receives the signal. Furthermore, the method 500 described in reference to FIG. 5 may be extended to higher modulation with generally better reliability and accuracy. However, the drawback of method 500 as compared to method 400 is that the former may require a more complex implementation and more processing time.

At least some of the various blocks, operations, and techniques described above may be implemented in hardware, a processor executing firmware instructions, a processor executing software instructions, or any combination thereof. When implemented in a processor executing firmware or software instructions, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

Although the forgoing text sets forth a detailed description of numerous different embodiments, it should be understood that the scope of the patent is defined by the words of the claims set forth at the end of this patent. For example, one or more steps of methods described above may be performed in a different order (or concurrently) and still achieve desirable results. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method comprising:
    receiving a plurality of signals via a plurality of receive antennas of a receiver, each of the plurality of signals having been received via a respective receive antenna; and
    estimating a noise power imbalance across the plurality of receive antennas, including estimating, based on the plurality of signals, a plurality of noise powers corresponding to the plurality of receive antennas, wherein each noise power corresponds to a respective antenna,
    wherein the signal corresponding to one of the receive antennas is an OFDM signal, and
    wherein estimating the noise power imbalance comprises estimating a noise power corresponding to the one receive antenna including estimating a plurality of channel gains corresponding to a plurality of subcarriers in the OFDM signal.

2. The method of claim 1, wherein estimating the noise power imbalance comprises estimating noise power corresponding to one of the receive antennas based only on a portion of the corresponding signal, the portion corresponding to at least one field in a preamble of a data unit.

3. The method of claim 1, wherein estimating the noise power corresponding to the one receive antenna further comprises estimating a plurality of symbols based on the plurality of channel gains.

4. The method of claim 3, wherein estimating the plurality of symbols comprises dividing each of the subcarriers by a corresponding channel gain.

5. The method of claim 1, wherein estimating the noise power corresponding to the one receive antenna further comprises:
    estimating a plurality of symbols including demodulating and decoding a portion of the signal corresponding to the one receive antenna;
    re-encoding an re-modulating the decoded and demodulated portion of the signal corresponding to the one receive antenna; and
    comparing the re-encoded an re-modulated portion of the signal to the portion of the signal corresponding to the one receive antenna.

6. A method comprising:
    receiving a plurality of signals via a plurality of receive antennas of a receiver, each of the plurality of signals having been received via a respective receive antenna; and
    estimating a noise power imbalance across the plurality of receive antennas, including estimating, based on the plurality of signals, a plurality of noise powers corresponding to the plurality of receive antennas, wherein each noise power corresponds to a respective antenna,
    wherein the signal corresponding to one of the receive antennas is an OFDM signal, and
    wherein estimating the noise power imbalance comprises estimating a noise power corresponding to the one receive antenna including estimating a plurality of instantaneous noise signals corresponding to a plurality of subcarriers of the OFDM signal.

7. The method of claim 6, wherein estimating the noise power corresponding to the one receive antenna comprises determining an average value of the plurality of instantaneous noise signals across the plurality of subcarriers.

8. The method of claim 1, further comprising scaling the plurality of signals based on the estimated noise power imbalance.

9. A method, comprising:
    receiving a plurality of signals via a plurality of receive antennas; and
    estimating a plurality of noise powers corresponding to the plurality of receive antennas based on the plurality of received signals, each noise power corresponding to a respective receive antenna,
    wherein the signal corresponding to one of the receive antennas is an OFDM signal, and
    wherein estimating the noise power imbalance comprises estimating a noise power corresponding to the one receive antenna including estimating a plurality of channel gains corresponding to a plurality of subcarriers in the OFDM signal.

10. The method of claim 9, further comprising scaling the plurality of signals based on the plurality of estimated noise powers.

11. The method of claim 10, wherein scaling the plurality of signals comprises generating a plurality of scaling factors corresponding to the plurality of receive antennas based on the plurality of noise powers and scaling the plurality of signals with the plurality of scaling factors.

12. An apparatus, comprising:
    a plurality of noise power estimators to estimate respective noise powers corresponding to a plurality of receive antennas based on respective signals received via the plurality of receive antennas;
    a plurality of scaling factor generators to generate a plurality of respective scaling factors based on the plurality of noise powers; and
    a plurality of amplifiers to scale signals received via the plurality of receive antennas based on the plurality of scaling factors,
    wherein the plurality of signals are OFDM signals, and
    wherein each of the noise power estimators is configured to estimate a plurality of channel gains corresponding to a plurality of subcarriers in the corresponding OFDM signal and to estimate the corresponding noise power based on the plurality of channel gains.

13. The apparatus of claim 12, wherein each of the noise power estimators is configured to estimate the corresponding noise power based only on a portion of the corresponding signal, the portion of the signal corresponding to at least one field in a preamble of a data unit.

14. The apparatus of claim 12, wherein each of the noise power estimators is configured to estimate a plurality of symbols corresponding to the plurality of subcarriers based on the plurality of corresponding channel gains.

15. The apparatus of claim 14, wherein each of the noise power estimators is configured to estimate the plurality of symbols based on dividing each of the plurality of subcarriers by a corresponding channel gain.

16. The apparatus of claim 12, wherein each of the noise power estimators is further configured to:
    decode and demodulate a portion of the signal corresponding to the respective receive antenna;

re-encode an re-modulate the decoded and demodulated portion of the signal corresponding to the respective receive antenna; and compare the re-encoded an re-modulated portion of the signal to the portion of the signal corresponding to the respective receive antenna.

17. An apparatus comprising:

a plurality of noise power estimators to estimate respective noise powers corresponding to a plurality of receive antennas based on respective signals received via the plurality of receive antennas;

a plurality of scaling factor generators to generate a plurality of respective scaling factors based on the plurality of noise powers; and a plurality of amplifiers to scale signals received via the plurality of receive antennas based on the plurality of scaling factors, wherein each of the signals is an OFDM signal, and wherein each of the noise power estimators is configured to estimate a respective plurality of instantaneous noise signals corresponding to a respective plurality of subcarriers of the respective OFDM signal.

18. The apparatus of claim 17, wherein each of the noise power estimators is configured to determine an average value of the respective plurality of instantaneous noise signals across the respective plurality of subcarriers.

19. A method comprising:

receiving a plurality of signals via a plurality of receive antennas; and estimating a plurality of noise powers corresponding to the plurality of receive antennas based on the plurality of received signals, each noise power corresponding to a respective receive antenna, wherein the signal corresponding to one of the receive antennas is an OFDM signal, and wherein estimating the noise power imbalance comprises estimating a noise power corresponding to the one receive antenna including estimating a plurality of instantaneous noise signals corresponding to a plurality of subcarriers of the OFDM signal.

* * * * *